US 10,065,104 B2

(12) United States Patent
Dumitrescu et al.

(10) Patent No.: US 10,065,104 B2
(45) Date of Patent: Sep. 4, 2018

(54) METHOD AND APPARATUS FOR PROVIDING A COMPUTER IMPLEMENTED WORD GAME

(71) Applicant: KING.COM LIMITED, St. Julians (MT)

(72) Inventors: Adrian Dumitrescu, Bucharest (RO); Florin Diaconeasa, Bucharest (RO); Virgiliu Ionescu, Bucharest (RO); Cristian Gabriel Vrabete, Bucharest (RO)

(73) Assignee: KING.COM LTD., St. Julians (MT)

( * ) Notice: Subject to any disclaimer, the term of this patent is extended or adjusted under 35 U.S.C. 154(b) by 306 days.

(21) Appl. No.: 14/617,022

(22) Filed: Feb. 9, 2015

(65) Prior Publication Data
US 2016/0228775 A1 Aug. 11, 2016

(51) Int. Cl.
| | | |
|---|---|---|
| *A63F 9/24* | (2006.01) | |
| *A63F 3/04* | (2006.01) | |
| *A63F 13/537* | (2014.01) | |
| *A63F 13/533* | (2014.01) | |
| *A63F 13/2145* | (2014.01) | |
| *A63F 13/53* | (2014.01) | |

(52) U.S. Cl.
CPC ........ *A63F 3/0421* (2013.01); *A63F 13/2145* (2014.09); *A63F 13/53* (2014.09); *A63F 13/533* (2014.09); *A63F 13/537* (2014.09)

(58) Field of Classification Search
CPC .......... A63F 13/12; A63F 13/25; A63F 13/30; A63F 13/335; A63F 13/42; A63F 13/426; A63F 13/46; A63F 13/75; A63F 13/80; A63F 13/822; A63F 13/2145; A63F 13/53; A63F 13/533; A63F 13/537; A63B 71/06

See application file for complete search history.

(56) References Cited

U.S. PATENT DOCUMENTS

| | | | | |
|---|---|---|---|---|
| 6,276,940 | B1 * | 8/2001 | White | G09B 17/00 273/299 |
| 2007/0112554 | A1 * | 5/2007 | Goradia | G06F 17/2735 704/4 |

(Continued)

OTHER PUBLICATIONS

Bookworm (video game), Jul. 25, 2014, wikipedia, <https://en.wikipedia.org/w/index.php?title=Bookworm_(video_game)&oldid=618427537>.*

*Primary Examiner* — Justin Myhr
(74) *Attorney, Agent, or Firm* — Saul Ewing Arnstein & Lehr LLP

(57) ABSTRACT

A computer-implemented method of determining game objects to be displayed on a display comprising: causing to be displayed on the display a plurality of selectable game objects comprising tiles stored in at least one memory, each tile having a letter; operating a processor in communication with the at least one memory to cause the tiles to be arranged in a manner enabling a user to select one or more of the tiles in a manner that spells a word, the game board being updatable; and causing the processor to use at least one dictionary stored in the memory to select one or more words to be displayed on the game board, the at least one dictionary comprising a plurality of words of a first type and a plurality of words of a second type, wherein the method comprises the processor causing the tiles to be arranged such that the game board comprises at least one word of the second type.

19 Claims, 16 Drawing Sheets

(56) References Cited

U.S. PATENT DOCUMENTS

2009/0045574 A1\* 2/2009 Quinlan ............... A63F 3/0423
 273/272
2011/0049807 A1\* 3/2011 Benty .................... G09B 1/06
 273/299

\* cited by examiner

| First dictionary | Second dictionary |
|---|---|
| And | And |
| Book | Book |
| Capital | |
| Command | |
| Duration | |
| End | End |
| Extend | |
| Extrapolate | |
| Instruction | |
| Long | Long |
| Mandolin | |
| Module | |
| Page | Page |
| Time | Time |
| ... | ... |

Figure 5

| Dictionary |
|---|
| And¶ |
| Book¶ |
| Capital |
| Command |
| Duration |
| End¶ |
| Extend |
| Extrapolate |
| Instruction |
| Long¶ |
| Mandolin |
| Module |
| Page¶ |
| Time¶ |
| ... |

Figure 6

| First dictionary | Second dictionary |
|---|---|
| And | And |
| Book | Book |
| Capital | |
| Command | |
| Duration | |
| End | End |
| Extend | ⟶ Extend |
| Extrapolate | |
| Instruction | |
| Long | Long |
| Mandolin | |
| Module | |
| Page | Page |
| Time | Time |
| ... | ... |

Figure 7

METHOD AND APPARATUS FOR PROVIDING A COMPUTER IMPLEMENTED WORD GAME

FIELD OF THE INVENTION

Embodiments of this application relate to electronic dictionaries. The application is providing but not exclusively directed to controlling the content of electronic dictionaries in an online environment.

Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object. Most commonly, that touch is by a user's finger.

One particular context is that of a computer game where a game board is displayed to a user which has adjacent selectable objects, for example in the form of letter tiles. In one game, the mechanic of the game is that a user should select a set of tiles in succession and thereby form words. The successful delivery of this game depends on the game application being able to generate letter tiles in a way that enables a user to form those words.

One such game is a game called Alphabetty available via the Royal game website. In this game, a user must select adjacent letters to form a word. When a word has been formed, the letters are automatically removed from the screen and letter tiles above the removed letters drop down. New letter tiles are provided to the screen from above to replenish the gaps now left by the tiles which have dropped down.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In a first aspect there is provided a computer-implemented method of determining game objects to be displayed on a display comprising: causing to be displayed on the display a plurality of selectable game objects comprising tiles stored in at least one memory, each tile having a letter; operating a processor in communication with the at least one memory to cause the tiles to be arranged in a manner enabling a user to select one or more of the tiles in a manner that spells a word, the game board being updatable; and causing the processor to use at least one dictionary stored in the memory to select one or more words to be displayed on the game board, the at least one dictionary comprising a plurality of words of a first type and a plurality of words of a second type, wherein the method comprises the processor causing the tiles to be arranged such that the game board comprises at least one word of the second type.

According to some embodiments, the plurality of words of a second type comprise words more commonly used in a given language than the plurality of words of a first type.

According to some embodiments, the plurality of words of a first type and the plurality of words of a second type are stored in the same dictionary, and distinguished from each other by means of one or more flags.

According to some embodiments, the plurality of words of a first type are stored in a first dictionary, and the plurality of words of a second type are stored in a second dictionary.

According to some embodiments, the second dictionary comprises fewer words than the first dictionary.

According to some embodiments, the method is comprised in a multi-level game.

According to some embodiments, the method comprises arranging the game board with a different arrangement of tiles when replaying a level.

According to some embodiments, the multi-level game comprises levels of varying difficulty.

According to some embodiments, the one or more words caused to be displayed on the game board are selected in dependence on the difficulty of the level.

According to some embodiments, a word length of the one or more words is selected in dependence on the difficulty of the level.

According to some embodiments, a direction of the one or more words on the game board is selected in dependence on the difficulty of the level.

According to some embodiments, an orientation of the one or more words on the game board is selected in dependence on the difficulty of the level.

According to some embodiments the difficulty of the level is determined by a game designer.

According to some embodiments, the at least one dictionary is updatable.

According to some embodiments, the arranging the tiles such that the game board comprises at least one word of the second type is in response to initiating the game board.

According to some embodiments, the arranging the tiles such that the game board comprises at least one word of the second type is in response to updating the game board.

In a second aspect there is provided a computer-implemented method comprising: receiving information of at least one word spelled by one or more users on one or more respective game boards of one or more respective displays; operating a processor in communication with at least one memory to determine a property of the at least one word received; and the processor causing at least one dictionary stored in the at least one memory to be selectively updated in response to the determining the property, the at least one dictionary comprising a plurality of words of a first type and a plurality of words of a second type.

According to some embodiments, the at least one word received comprises a word of the first type, and the method comprises updating the dictionary to change a status of the received word in the dictionary to be a word of the second type.

According to some embodiments, the method comprises determining that the word spelled by a user is not comprised in the at least one dictionary, and the method comprises adding the word spelled by a user to the at least one dictionary.

According to some embodiments, the plurality of words of a first type and the plurality of words of a second type are stored in the same dictionary, and distinguished from each other by means of one or more flags.

According to some embodiments, the plurality of words of a first type are stored in a first dictionary, and the plurality of words of a second type are stored in a second dictionary.

According to some embodiments, the plurality of words of a second type comprise words more commonly used in a given language than the plurality of words of a first type.

According to some embodiments, the property of the at least one word spelled by one or more users comprises a count of how often the at least one word is received.

According to some embodiments, the property of the at least one word spelled by one or more users comprises a frequency with which the at least one word is received.

According to some embodiments, the one or more respective displays are comprised in one or more respective user devices.

According to some embodiments, the method comprises transmitting information to the one or more user devices.

According to some embodiments, the information transmitted to the one or more user devices comprises information for updating at least one dictionary at the one or more user devices.

According to some embodiments, the method is carried out at a server in communication with a device, the information received from the device.

According to some embodiments, the method is carried out on a device, the device comprising the display.

In a third aspect there is provided a device having a user interface configured to display a game board having a plurality of selectable game objects comprising tiles displayed in a configuration on said game board, each game object having a boundary defined on the user interface, said user interface being configured to receive user input, and at least one processor in connection or communication with at least one memory and the user interface and configured to: cause to be displayed on a display a plurality of selectable game objects comprising tiles stored in the at least one memory, each tile having a letter; cause the tiles to be arranged in a manner enabling a user to select one or more of the tiles in a manner that spells a word, the game board being updatable; and use at least one dictionary stored in the memory to select one or more words to be displayed on the game board, the at least one dictionary comprising a plurality of words of a first type and a plurality of words of a second type; and cause the tiles to be arranged such that the game board comprises at least one word of the second type.

According to some embodiments, the plurality of words of a second type comprise words more commonly used in a given language than the plurality of words of a first type.

According to some embodiments, the plurality of words of a first type and the plurality of words of a second type are stored in the same dictionary, and distinguished from each other by means of one or more flags.

According to some embodiments, the plurality of words of a first type are stored in a first dictionary, and the plurality of words of a second type are stored in a second dictionary.

According to some embodiments, the second dictionary comprises fewer words than the first dictionary.

According to some embodiments, the game board comprises a multi-level game.

According to some embodiments, the device is configured to cause arranging the game board with a different arrangement of tiles when replaying a level.

According to some embodiments, the multi-level game comprises levels of varying difficulty.

According to some embodiments, the one or more words caused to be displayed on the game board are selected in dependence on the difficulty of the level.

According to some embodiments, a word length of the one or more words is selected in dependence on the difficulty of the level.

According to some embodiments, a direction of the one or more words on the game board is selected in dependence on the difficulty of the level.

According to some embodiments, an orientation of the one or more words on the game board is selected in dependence on the difficulty of the level.

According to some embodiments the difficulty of the level is determined by a game designer.

According to some embodiments, the at least one dictionary is updatable.

According to some embodiments, the arranging the tiles such that the game board comprises at least one word of the second type is in response to an initiation of the game board.

According to some embodiments, the arranging the tiles such that the game board comprises at least one word of the second type is in response to an updating of the game board.

In a fourth aspect there is provided an apparatus having at least one processor in connection or communication with at least one memory and configured to: receive at a receiver of the apparatus information of at least one word spelled by one or more users on one or more respective game boards of one or more respective displays; determine a property of the at least one word received; and selectively update at least one dictionary stored in the at least one memory in response to the determining the property, the at least one dictionary comprising a plurality of words of a first type and a plurality of words of a second type.

According to some embodiments, the at least one word received comprises a word of the first type, and the apparatus is configured to update the dictionary to change a status of the received word to be a word of the second type.

According to some embodiments, the apparatus is configured to determine that the word spelled by a user is not comprised in the at least one dictionary, and cause the word spelled by a user to be added to the at least one dictionary.

According to some embodiments, the plurality of words of a first type and the plurality of words of a second type are stored in the same dictionary, and distinguished from each other by means of one or more flags.

According to some embodiments, the plurality of words of a first type are stored in a first dictionary, and the plurality of words of a second type are stored in a second dictionary.

According to some embodiments, the plurality of words of a second type comprise words more commonly used in a given language than the plurality of words of a first type.

According to some embodiments, the property of the at least one word spelled by one or more users comprises a count of how often the at least one word is received.

According to some embodiments, the property of the at least one word spelled by one or more users comprises a frequency with which the at least one word is received.

According to some embodiments, the one or more respective displays are comprised in one or more respective user devices.

According to some embodiments, the apparatus comprises a transmitter, the transmitter for sending information to the one or more user devices.

According to some embodiments, the information transmitted to the one or more user devices comprises information for updating at least one dictionary at the one or more user devices.

According to some embodiments, the apparatus comprises a server in communication with a device, the information received from the device.

According to some embodiments, the apparatus comprises the one or more respective displays.

In a fifth aspect there is provided a computer readable storage device storing instructions that, when executed by at least one processor of a device having a user interface configured to display a game board having a plurality of selectable game objects comprising tiles stored in at least one memory and displayed in a configuration on said game board, each game object having a boundary defined on the user interface, said user interface being configured to receive user input, causes said at least one processor to perform the following steps: display on a display a plurality of selectable game objects comprising tiles stored in at least one memory, each tile having a letter; arrange the tiles in a manner enabling a user to select one or more of the tiles in a manner that spells a word, the game board being updatable; and use at least one dictionary stored in the memory to select one or more words to be displayed on the game board, the at least one dictionary comprising a plurality of words of a first type and a plurality of words of a second type, and cause the tiles to be arranged such that the game board comprises at least one word of the second type.

In a sixth aspect there is provided a computer readable storage device storing instructions that, when executed by at least one processor of an apparatus, causes said at least one processor to perform the following steps: receive information of at least one word spelled by one or more users on one or more respective game boards of one or more respective displays; determine a property of the received at least one word; and cause at least one dictionary stored in the at least one memory to be selectively updated in response to the determining the property, the at least one dictionary comprising a plurality of words of a first type and a plurality of words of a second type.

BRIEF DESCRIPTION OF DRAWINGS

To understand some embodiments, reference will now be made by way of example only to the accompanying drawings, in which:

FIGS. 5 to 7 show example dictionaries according to some embodiments;

DETAILED DESCRIPTION OF SOME EMBODIMENTS

The techniques described herein may be implemented in for instance a computer implemented tile based word game such as "Alphabetty™" of the applicant, which involves selecting game objects in the form of letter tiles to make words to score points against either a target or another player in a tournament or other multiplayer environment.

In some embodiments, the game may be provided with different levels. Each level may have a specific goal. Each level may have a specific difficulty associated with it. The harder a level, generally the less likely a level is to be completed and/or the greater the required skill of the player.

Figure 1:
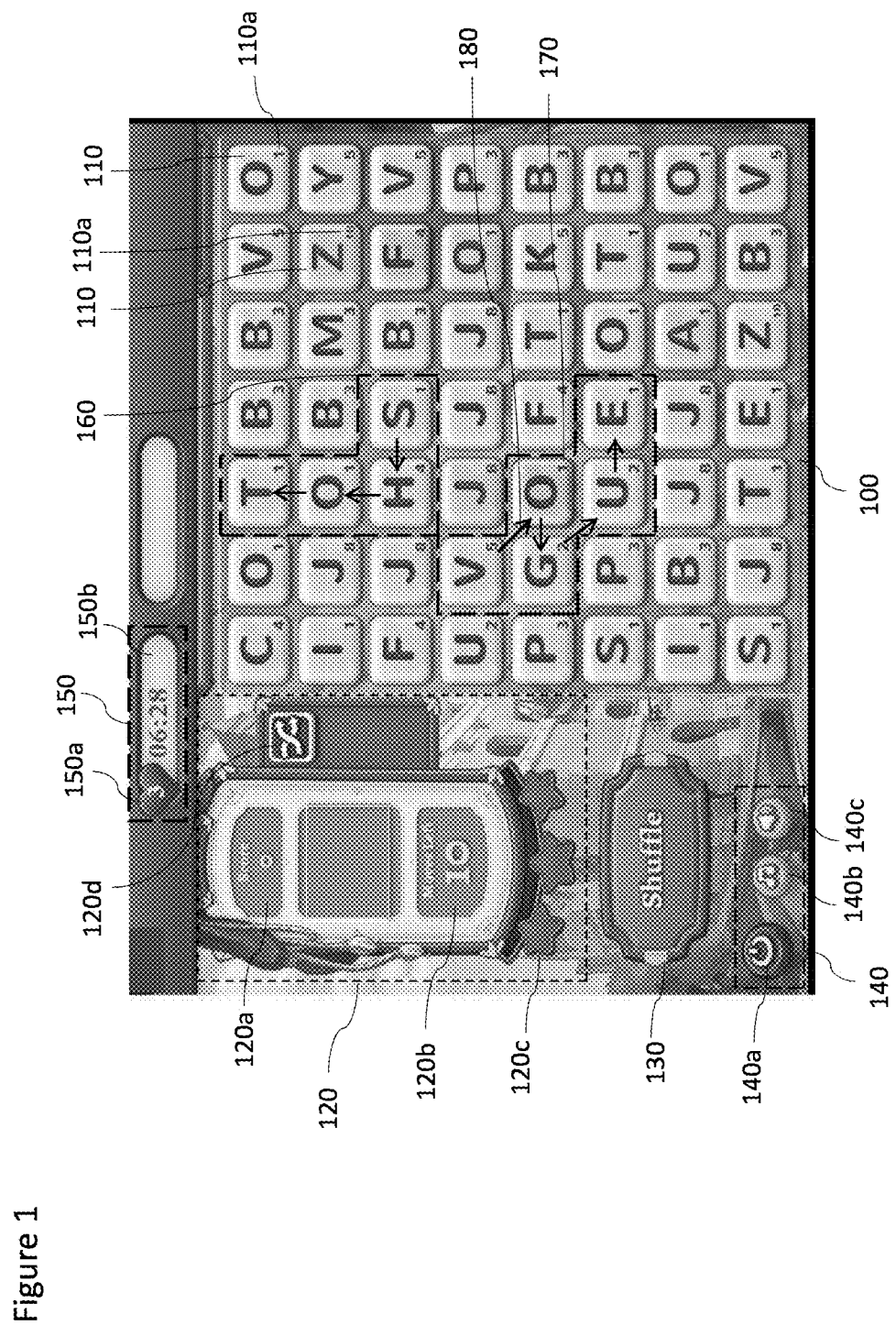
FIG. 1 shows an example embodiment of a game board.

FIG. 1 shows an example game board of a letter tile based computer implemented game according to an embodiment.

The game board 100 or playable area 100 is displayed upon which are disposed game objects 110. The game objects 110 in this embodiment comprise letter tiles which may have varying characteristics. The characteristics may be one or more of color, shape, and/or different scores 110a per object or tile 110. In this embodiment, the objects 110 are square letter tiles arranged in a rectangular grid like fashion, although in other embodiments other game board configurations and other game object shapes or tiles may be utilized.

A game object may also comprise an "entity" rather than a tile. Whereas a tile may be considered a space on a game board grid, an entity may be considered something that occupies that space.

In some embodiments, "blockers" may be present which may act to block a user during gameplay. The blocker may be a blank tile which cannot be used to form a word, or some form of entity. Such blockers can therefore be used to make a level harder. A blocker may be a permanent fixture in a given level, or may be removable, for example by using adjacent tiles to form a word which tiles are then removed from the game board. An example of a blocker is a "rock-blocker". The blocker may switch position during gameplay or may be fixed in position Another type of special object is a "booster". A booster may operate to help increase a user's score, for example by increasing the number of tiles removed from the game board. One example of a booster is a "bomb" tile or entity. The bomb entity may comprise a bomb-shaped icon. The bomb icon may be activated by including it in a word or including adjacent tiles in a selected word. A parameter such as a game target, when reached, may also cause a bomb entity to be activated. When a bomb is activated it may "explode", causing a plurality of adjacent tiles to be removed from the game board, thus increasing the user's score.

There may be different types of exploding entities. For example a "line blaster" is a type of booster whose explosion can be controlled to give extra points whilst destroying other letters on the table. A "flask bomb" on the other hand has a countdown timer and when it explodes it takes away a number of remaining moves (e.g. two moves), but does not remove any tiles from the board. Therefore the "flask bomb" may be considered a type of blocker.

In some embodiments, the game may be implemented so that a level or a game session is completed when a certain target is reached by the user.

The target may comprise achieving a certain score by selecting tiles 110 to make words, each word scoring a total score at least in part in dependence on each of the individual tile scores 110a selected.

The target may alternatively be to remove one or more specific tiles, make a certain number of words, make a given number (where the number is one or more) of words having a given length or the like, use a particular tile a given number of times (where the number is one or more) or the like. Another example of a game objective includes cheese icons which need to be collected in a "cheese-falls" game mode, the idea being to cause cheese icons to fall off the bottom of the game board by removing lower tiles. It will of course be understood that cheese icons are one example only of the type of icon that could be used in such a game.

The game can in some embodiments end if the player or user runs out of time 150b or runs out of moves 120b before managing to reach a designated target (not shown).

The game board 100 may have a number of game objects 110 having different characteristics 110a aligned in rows and columns, such as a 7×8 grid as shown in FIG. 1. Other grid sizes may be suitable. In such an embodiment the game objects on the game board have three, five or eight nearest or adjacent neighbouring game object tiles. Other game board layouts or configurations may be provided. For example, triangular, pyramidal, hexagonal, octagonal or other layouts comprising position spaces or tiles within the game board 100 may be provided for display.

The game board 100 may be accompanied by a region 120 indicating a current score 120a and a number of moves remaining 120b as shown in the Figure.

There may also be provided control or optional actional items 130, 140, here shown as a shuffle control 130, and a game reset or off control 140a, music 140b and sound or volume control 140c.

The game board 100 may in some embodiments be accompanied by a region 150 indicating a timer or countdown 150b and a number of lives 150a remaining to the player.

The game board 100 shows region 160 in which a word may be formed. For example, region 160 indicates the word S-H-O-T being selected by individual selection of the game objects tiles 110, forming the word "shot" scoring a total of seven points. The forming of the word "shot" here involves only horizontal and vertical movement or selection via touch input.

Game board 100 of FIG. 1 also shows an example region 170 wherein the word "Vogue" is spelled. As can be seen, to create this word scoring 11 points, requires diagonal selection of neighbouring object tiles 100, as shown by arrow 180 indicated in the Figure.

When a word (e.g. "Shot", "Vogue" etc) is spelled, then the letter tiles forming those words are automatically removed from the screen and letter tiles above the removed letters drop down. New letter tiles are provided to the screen from above to replenish the gaps now left by the tiles which have dropped down. New tiles are added to the game board in a manner that ensures that there are letter combinations on the game board that allow one or more words to be spelled by a user, in some embodiments.

Figure 2:
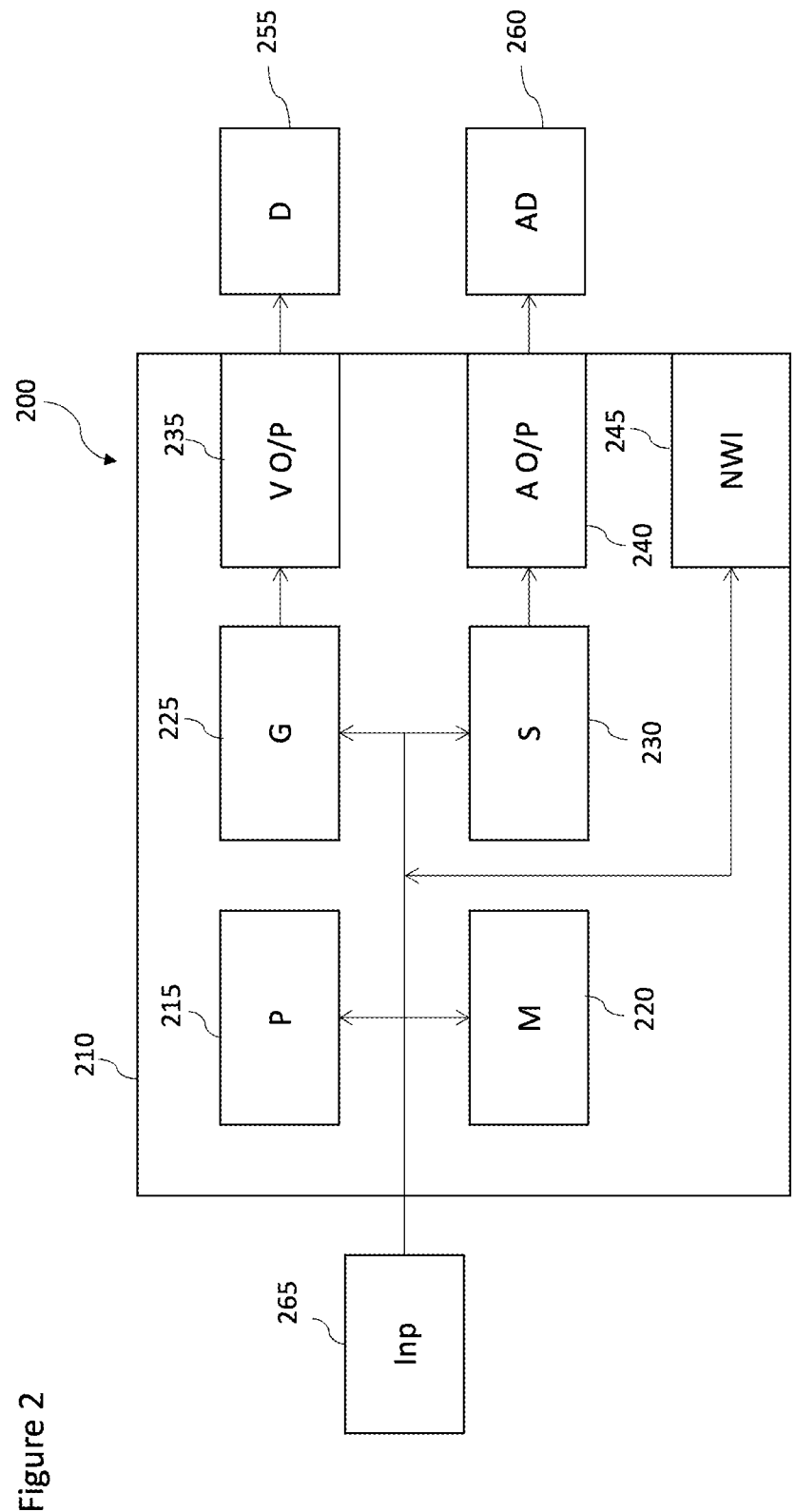
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
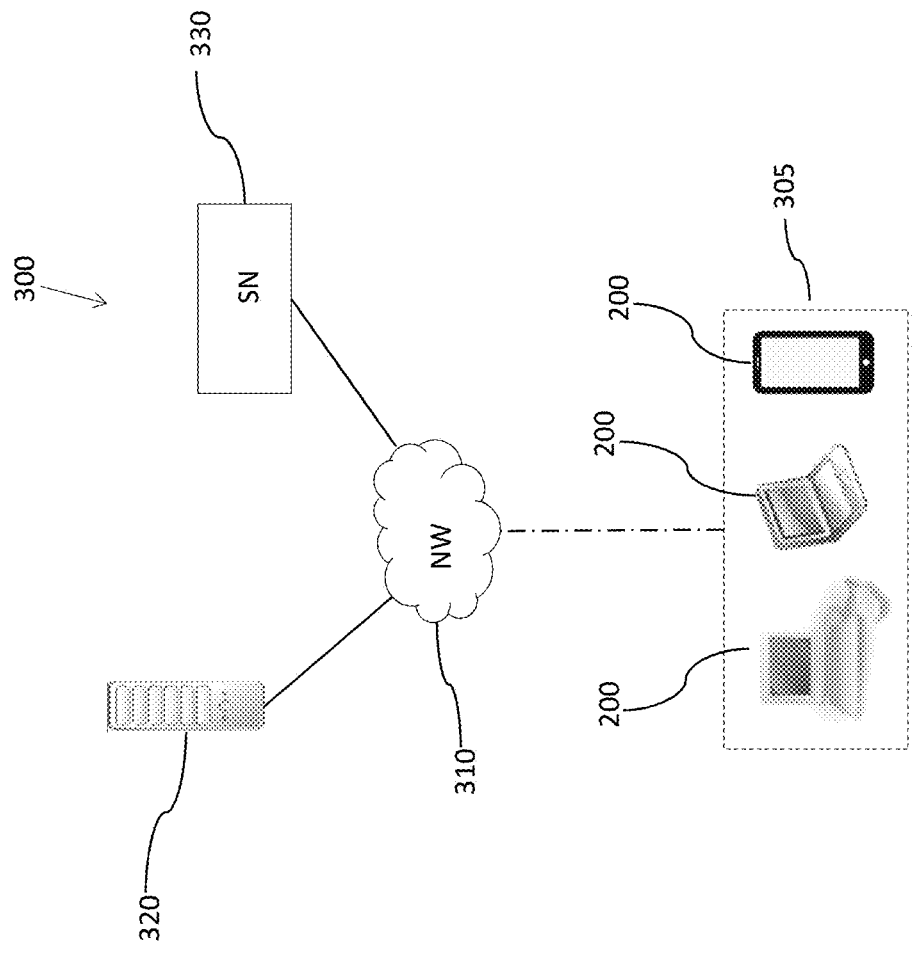
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Embodiments utilise a dictionary or lists of words containing "valid" words. The dictionary is stored in a memory. In an embodiment, a dictionary comprises a store or list of all valid words that will be accepted during gameplay. When a user spells a word (or attempts to spell a word) on the game board during a game, then the spelled word is compared with the list of valid words contained in the dictionary. If a spelled word is deemed to be valid, then the tiles associated with that word can be removed from the game board and a score can be assigned to the user related to the scores assigned to those particular tiles (plus any bonus points that may be assigned). If it is determined that the word is not a valid word, then no score is assigned to the user and the tiles remain in place. An alert may be provided to the user to indicate that the selected word is invalid. When a game board is initiated or updated during play, then a cross-check with the dictionary may be made to ensure that at least one valid word from the dictionary is comprised in the game board.

Figure 8:
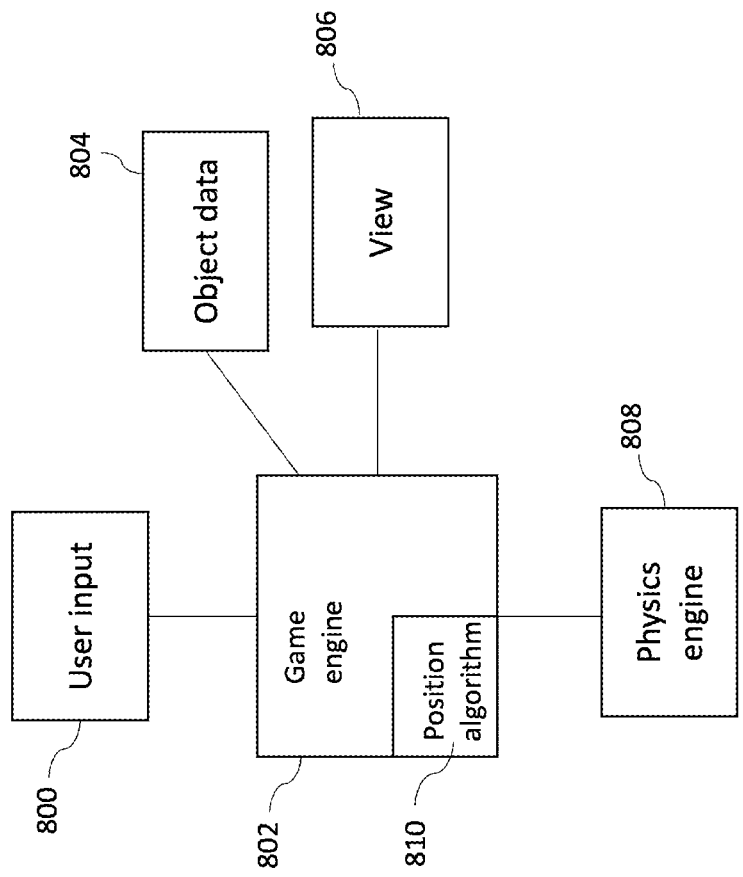
FIG. 8 schematically shows the functional blocks of an embodiment.

Reference is made to FIG. 8 which schematically shows the functional blocks of an embodiment, which may enable such game play. A user input block 800 is shown. This captures the user input and feeds the input to a game engine 802. In the context of the Alphabetty game of some embodiments, this user input may be which tiles are selected by a user and in which direction. This user input can be via any suitable user interface, such as discussed earlier.

The game engine 802 will process the information provided by the user input. The game engine 802 (for example a game model) will determine if a valid combination has been made.

Each object (e.g. letter tile) has object data associated therewith. The object data 804 may be stored in any suitable memory location. In some embodiments, the object data may be considered to be part of the game engine and in other embodiments may be considered to be outside the game engine. The object data may provide information as to the properties of an object. These properties can include attribute information such as colour and/or whether or not an object has a particular function such as a so-called booster function. The object data may include the position data, that is information representing the position of the object in the displayed image.

In some embodiments, the game engine will check if the game object satisfies the rule or rules for a valid match. The rule or rules which define whether or not a valid match has been made will be dependent on the game. In some embodiments, objects which have been selected will make a match if together they spell a valid word. In some embodiments, the game objects which match are removed.

Thus, the game engine will be in control of the matching mechanism. The game engine will have access to data for each tile including its position and which letter of the alphabet that tile represents, and will be able to determine if a match is made with a valid word. If a match is made, the tiles in the match are removed.

A physics engine 808 is provided which is configured to control the movement of the falling objects. This will be an object which has been caused to move or be removed as a result of a previous match. The physics engine will generally manage the movement of an object based on for example gravity which controls the falling of the object, collision detection, when the falling object hits another object and optionally rotation calculations when the falling object rolls, for example, down the side of the other objects.

The movement of the object is thus controlled by the physics engine, which will control the movement of an object as it falls, rolls down other objects etc.

The physics engine 808 may be part of the game engine 802.

A position control block 810 is provided. In the embodiment shown, this position control block may be part of the game engine. In other embodiments, this position control block may be outside the game engine. The position control block may be provided by a position algorithm in some embodiments.

A view function 806 uses of the object data to provide the displayed image with which the user is able to view and/or interact.

Figure 4:
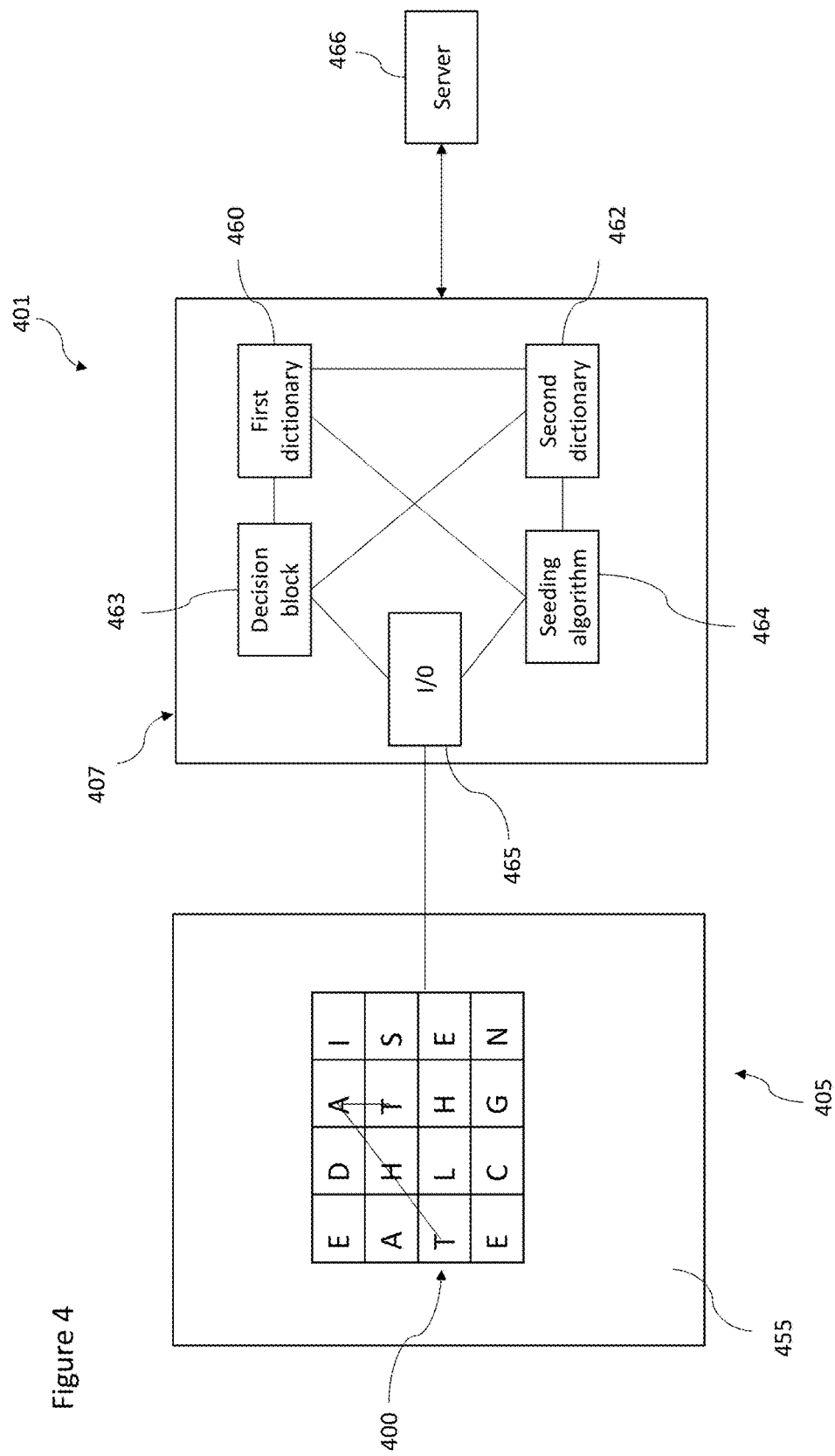
FIG. 4 also shows an example system in which some embodiments may be provided.

FIG. 4 is a schematic diagram showing a system 401 according to an embodiment. It will be understood that this diagram is simplified for the purposes of explanation, and that embodiments may be implemented in other ways. The system described with respect to FIG. 4 may operate in conjunction with the functional blocks described with respect to FIG. 8.

The system comprises a display 455 on a device 405. The display 455 is configured to display a game board 400. The device may be any suitable device such as a mobile phone, tablet, PC, laptop etc. The display 405 may be a touch screen display. Additionally or alternatively a user can navigate the display in another manner, such as by controlling a cursor with a mouse (in which case the display might not necessarily be touch screen).

A processing block is schematically shown at 407. The processing block may comprise one or more memories and one or more processors, for example as described with respect to FIG. 2. The processing block is communicatively connected to the display 405 via In-Out (I/O) interface 465. The processing block also comprises a first dictionary 460, a second dictionary 462, a decision block 463, and a seeding algorithm 464. These are explained in more detail below.

The processing block 407 is in communication with server 466, such as a game server.

Although shown in a separated manner for the purposes of explanation, the elements shown within the processing block 407 in FIG. 4 can be contained within or distributed between the device 405 and the server 466 in any way. For example, the I/O interface 465, decision block 463, seeding algorithm 464, first dictionary 460 and second dictionary 462 could all be comprised within the device 405. In other embodiments they may be comprised in the server 466. The elements of the system may also be distributed across the system 401. For example, first dictionary 460 and second dictionary 462 may be stored on server 466, with decision block 463 and seeding algorithm 464 stored on the device 405. Some elements of the system may be stored on both the server 466 and the device 405. For example a "master" copy of the first and second dictionaries may be stored at the server 466, with the device 405 also locally storing a copy of one or both of those dictionaries.

The first dictionary 460 may be considered a "full" or "complete" dictionary i.e. a dictionary that contains a list of all valid words that will be accepted during gameplay. The first dictionary may in some embodiments comprise a complete or near-complete list of words in a given language (for example for an English dictionary a list of words equivalent to those contained in the Oxford English Dictionary). The second dictionary 462 may be a smaller dictionary, or smaller list of words, compared to the first dictionary 460. That is the second dictionary 462 may comprise fewer words than first dictionary 460. In some embodiments the second dictionary 462 comprises a list of commonly used words i.e. a list of words that are most often used in common parlance in a given language. For example the second dictionary may contain words such as "from", "and", "time", "the", "that" etc. The words in the second dictionary 462 may also be contained in the first dictionary 460; that is the second dictionary 462 may be considered to contain a subset of words of the first dictionary 460, or in other words at least some of the information in the second dictionary is a duplicate of information in the first dictionary.

This is shown for Example in FIG. 5, which shows the content of a first dictionary and the content of a second dictionary (it will be understood that FIG. 5 is for the purposes of explanation only and that in embodiments the first dictionary and second dictionary will contain a larger list of words). In FIG. 5 the first dictionary contains the full list of valid words that will be accepted during gameplay. The second dictionary contains a subset of words from the first dictionary which are considered to be common words. In this example the words "And", "Book", "End", "Long", "Page" and "Time" are considered common words and are contained in the second dictionary. Although the list of common words may predominantly comprise words of a relatively short length, it will of course be appreciated that a relatively long word may also be a common word (e.g. "chocolate").

In another embodiment the common words contained in the second dictionary 462 are not contained in the first dictionary 460 i.e. there is no duplication between the first and second dictionaries.

In another embodiment the "first dictionary" and "second dictionary" are combined in a single dictionary, with commonly used words (i.e. those of the type that would otherwise be contained in the second dictionary) distinguished in some way from less commonly used words in the dictionary or list e.g. by means of a flag. This is shown for example in FIG. 6 in which the common words "And", "Book", "End", "Long", "Page" and "Time" are distinguished from less commonly used words by means of a flag in the form of a symbol "¶".

For ease of explanation embodiments will be described in terms of "first" and "second" dictionaries, although it will be understood that this also encompasses the above described concept of a single dictionary in which commonly used words (e.g. words from a "second" dictionary) are somehow distinguished from less commonly used words (e.g. words from a "first" dictionary), for example by means of a flag.

Referring back to FIG. 4, the first dictionary 460 and the second dictionary 462 are operatively connected to a seeding algorithm which is schematically shown at 464. The seeding algorithm 464 determines, or at least assists in determining, which words to place into game board 400, when initiating the game board or updating the game board. The seeding algorithm may also determine other parameters, such as a length of the word to be included, prior to selecting the chosen word. The seeding algorithm may also define other parameters such as a direction of the letters of the word (e.g. up, down, left, right, diagonal, or any combination of these), and an orientation of the word (e.g. forwards or backwards). Where the game is a multi-level game (a "saga"), the word chosen and the direction of the letter tiles making up the word may be dependent upon a difficulty of the level. As shown in FIG. 4 the game board 400 comprises the word "THAT", which is a commonly used word and therefore would have been selected by the seeding algorithm 464 from the second dictionary 462. However the orientation of the word "THAT" comprises a diagonal and a change of direction, providing some extra degree of difficulty.

Parameters or criteria which are operative to control word selection may be input to the seeding algorithm by the game designers. For example the game designers can decide for each level how many common words are to be included, what length the included words are to be, how complicated the direction and orientation is etc. The seeding algorithm can then work with these parameters when selecting words to be included in the game board. In some embodiments, the seeding algorithm might auto-choose the parameters based on something like the level difficulty, which level difficulty could also have been specified by the game designers. The level's shape and the location of blockers may be dependent on these factors also.

For example, when initiating or updating a game board 400 during play, the seeding algorithm may include a plurality of words in the game board 400 that can be spelled. The commonly used words contained in the second dictionary 462 may be considered easier words, or words that are more easily recognisable to a user when presented on the game board than words that are only contained in the first dictionary 460. In some embodiments the seeding algorithm 464 may select words from the second dictionary 462 only. In some embodiments, when determining the letter tiles to be presented on the game board 400 the seeding algorithm 464 may be configured to determine how many words on the game board 400 are to be selected from the first dictionary 460, and how many words on the game board are to be selected from the second dictionary 462. This determination may take in to account the difficulty level of the level that is being played in the game or saga. For example, for an easy level the seeding algorithm 464 may choose predominantly common words from the second dictionary 462. For a harder level, the seeding algorithm may choose predominantly less common words from the first dictionary 460. As discussed above, the seeding algorithm may also determine, or assist in determining, the orientation and/or direction in which the word is spelled dependent upon the difficulty of the level. In some embodiments the seeding algorithm 464 may operate to ensure that there is always at least one word from the second dictionary 462 on the game board.

In some embodiments, it is not necessarily the case that a word selected from the second dictionary will be more easily recognisable than a word from the first dictionary, when presented on the game board. For example the word "Module" (which as shown in FIG. 5 is in the first dictionary only), spelled from left to right in the middle of the game board, might be easier to spell than the word "Time" (which as shown in FIG. 5 is contained in the second dictionary), spelled backwards and diagonally. That is although a certain word may be "common", that is not the only factor in determining how difficult it will be to spell when it is positioned on the game board.

In some embodiments, a minimum number of letters for a "valid" word may be set. For example the minimum number of letters may be set at three. This may be done in order to prevent the game from becoming too easy.

In some embodiments, the seeding algorithm 464 is configured to cause the game board 400 to be updated to display letter tiles in a different arrangement when a user is replaying a level. For example a user may have failed a level and needs to replay it in order to proceed further into the game. Rearranging the tiles means that a user will face a fresh challenge when replaying the level, thus enhancing the playing experience.

In some embodiments the game board is configured to always include at least one word from the second dictionary i.e. at least one commonly used word. In some embodiments this may be for some, but not all, levels. This aims to ensure that there will always be at least one word in the game board that can be spelled by a user. This may help to prevent a level from becoming impossible or unplayable to the average user.

Figure 15:
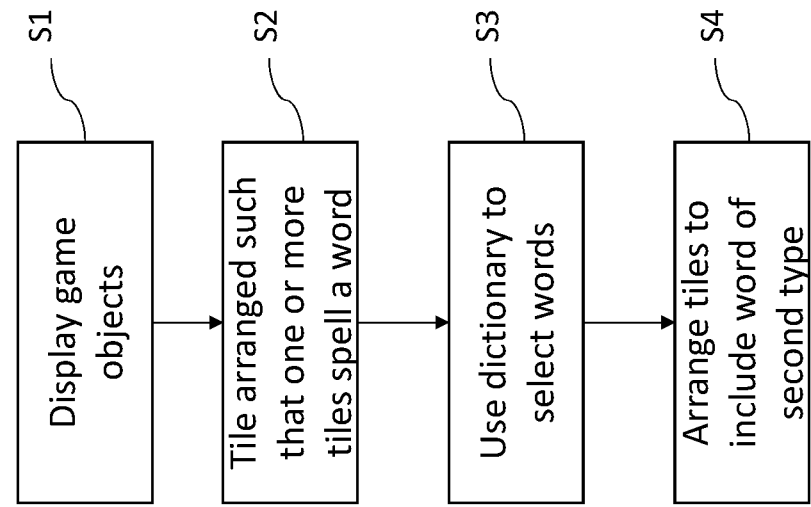
FIG. 15 is a flowchart according to an embodiment.

FIG. 15 is a flowchart according to some embodiments.

At step S1, a plurality of selectable game objects comprising tiles are caused to be displayed on a display. The tiles or information pertaining thereto may be stored in at least one memory.

At step S2, a processor in communication with the at least one memory causes the tiles to be arranged in a manner enabling a user to select one or more of the tiles in a manner that spells a word. The game board is updatable.

At step S3 the processor is caused to use at least one dictionary stored in the memory to select one or more words to be displayed on the game board. The at least one dictionary comprises a plurality of words of a first type and a plurality of words of a second type.

At step S4, the processor causes the tiles to be arranged such that the game board comprises at least one word of the second type.

The method described in steps S1 to S4 may be in response to initiating the game board, or may be in response to updating the game board.

Having first and second dictionaries may assist in speeding up the process of updating or initiating a game board during play. For example it may be quicker for a computer (or hardware and/or software thereon) to select words from the dictionary of common words (second dictionary), which comprises a smaller list of words to select from than the full list in the first dictionary. The seeding algorithm may be configured to determine when to use the first dictionary, or second dictionary, or both, when selecting a word for the game board. The determination may be based upon any one or more of: difficulty of a level; perceived ability of a user; length of word required; amount of time left in the game etc.

In some embodiments, one or both of the first dictionary 460 and second dictionary 462 are updatable. The one or more dictionaries may be updatable in response to receiving information of words entered by one or more users. In some embodiments a word can be transferred or copied from the first dictionary 460 to the second dictionary 462 when it is determined that that word is a commonly used word or has become a commonly used word. By "copied" is meant that the word in question will then be comprised in both the first and second dictionaries. In such an embodiment the first dictionary will retain a full list of valid words. For example, if a particular word is being entered often by one or more users, then a determination may be made that that word should be comprised in the dictionary of commonly used words. This may involve determining a count of a number of times a word is entered by one or more users during gameplay. For example if it is determined that a certain word has been entered by one or more users more than a threshold number of times (e.g. 1000), then it can be determined that that word is a commonly used word. If it is determined that that particular word is contained in the first dictionary 460 but not in the second dictionary 462, then that word may be copied to the second dictionary 462 from the first dictionary 460.

This concept is shown in FIG. 7, in which it has been determined that the word "Extend" has become a commonly used word, and as such it has been copied to the second dictionary (the arrow in FIG. 7 is for explanatory purposes only). In some embodiments when a word is copied to the second dictionary then it can be removed from the first dictionary.

Other criteria may also be used to determine whether a word is or has become a commonly used word. For example a frequency of the use of a word may be used to determine whether a word is or has become a commonly used word. For example if a word is entered by one or more users more than 100 times a day, then it may be determined that that word is a commonly used word.

In some embodiments the monitoring of the count and/or frequency of received words can determine whether that word has been entered by different users. For example, a parameter may be set which will cause a word to be considered a commonly used word only if it has been entered by a certain number of different users.

The determination of whether to copy a word to the second dictionary 462, and the actual copying or transferring of that word, may occur in real time during gameplay. Alternatively or additionally the updating of the dictionaries may be carried out periodically or on an ad-hoc basis. For example the device 405 may transmit game information to the server 462 in an electronic data message, which may be carried out on a periodic basis. The server 462 can then extract the data from the electronic message. Where the first dictionary 460 and second dictionary 462 are stored on the server 466, then they may be updated at the server following this periodic reporting. Updated dictionary information may then be transferred back to the device 405 in an electronic data message for storing of that updated dictionary information locally at the device 405. This may comprise the device extracting the necessary information from the electronic data message.

As discussed above, the dictionaries may be stored on an external server (i.e. external to the user device). The external server is configured to cope with large quantities of data, for example data from a large number of user devices. This is described with respect to FIGS. 9 to 14. The server architecture described with respect to these Figures may be suitable for updating the dictionaries in the manner described in this application.

Figure 9:
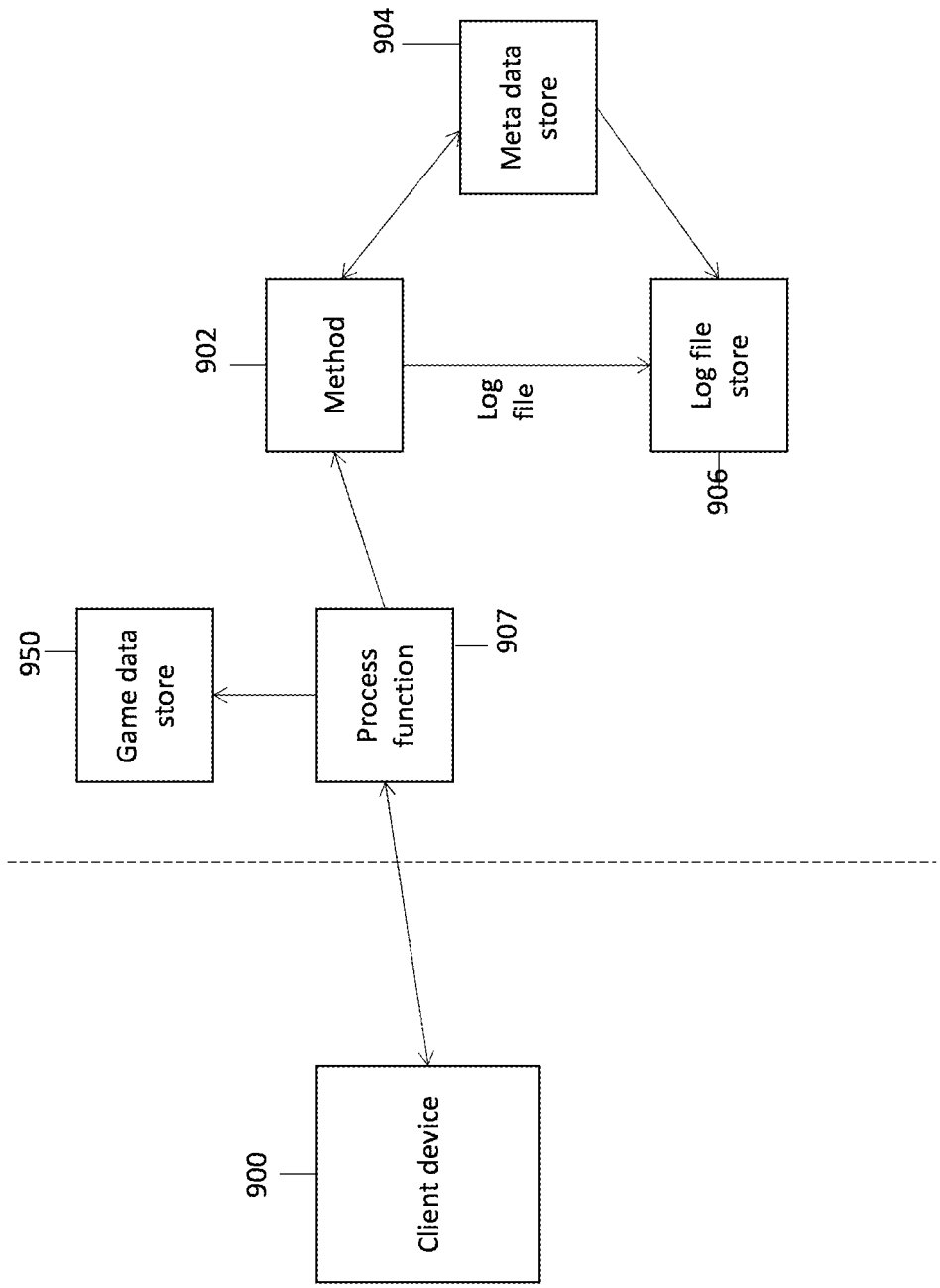
FIG. 9 schematically shows some of the functions provided by a server, according to some embodiments.

FIG. 9 is schematic and shows some of the functions provided on the server side. The physical entities which provide these functions may be any one or more suitable entities. The client device 900 (which may be as discussed in relation to FIG. 3) will allow the user to play the game. The client device will determine when a particular game event occurs and cause the client device to make a call to the method 902 which is on the server side. A process function 907 which may be provided by a server or the like will receive the call. The call is then directed to the method 902 by the process function. The method 902 may be on the same server as the process function or a different server to the process function. The server side also has the game data store 950 which stores a user's data, such as progress data or the like. Data for the game data store 950 may be received by the process function and directed to the game data store. In response to the invoking of the method 902, a log file is generated and is stored in a log file store 906. Any suitable data store 906 may be used to store the log file data 906, which may be the form of text files, as discussed above.

Meta data may provide a key to the data stored in the log files in the log file store. This will define for each of the game event identifiers, the format of the information stored in the log file. A separate store 904 can be provided for this metadata. This metadata store 904 can be used to determine how to parse the stored log files and allows new queries to be formulated easily. Analytics for the data can be determined by using the information in the metadata store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

The same method associated with the end of game event is used by one or more games. This means that all the log files associated with that same end of game method will have the same identifier so that analytics can be performed across more than one game. Like for like comparisons can be made for the same event across different games.

It should be appreciated that there may be a plurality of instances of the method which can be called. The methods will however be the same for the same associated game event, regardless of the game.

When writing a new game, a decision can be made as to what game events are to cause the generation of a log file. For each of those game events, a method stored on the server side will be invoked or called. The method which is stored on the server side will be the same regardless of the game. The game developer will therefore not need to write new code for the reporting associated with a particular game event. The game developer may make sure that the code generates the information, for example parameter values, for the method and that the particular game event will cause the client device to call the server. The game developer may need to ensure that the semantics used in the game match the semantics used in the game event method.

It should be appreciated that embodiments may be used with any suitable game event. The game event may be the completion of a level, the start of a game, the ending of a game, purchasing of a particular item, interaction with one or more friend, a particular score or the like.

Figure 10:
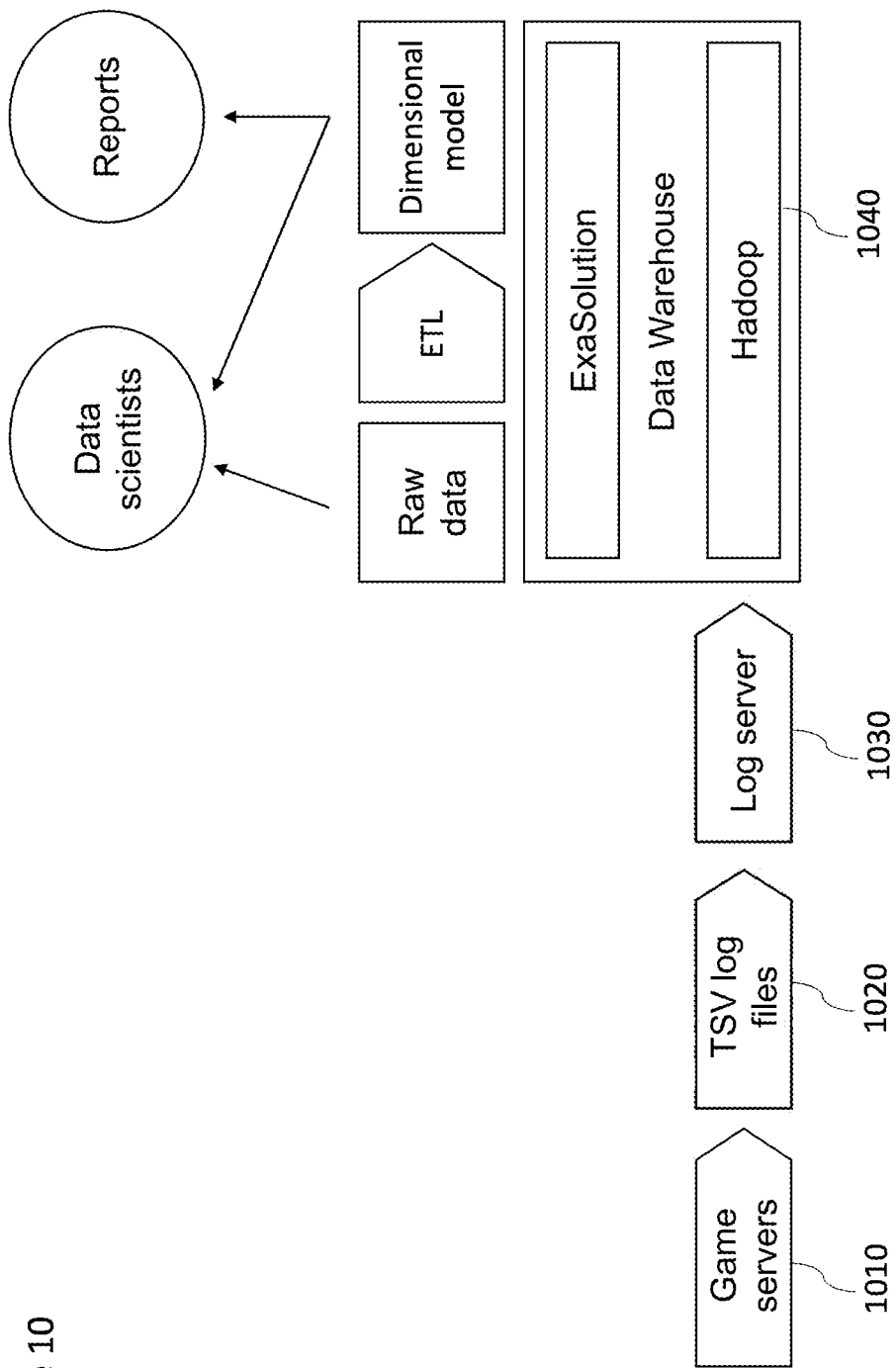
FIG. 10 shows a data pipeline according to some embodiments.

FIG. 10 shows a data pipeline. The data pipeline may be used with the system of FIG. 9 and/or in any other suitable scenario. The pipeline comprises game servers 1010, TSV (tab separated value) log files 1020, a log server 1030 and a data warehouse 1040. At the data warehouse, data is processed from raw data (which may be provided directly to data scientists) to a dimensional model which may be used to provide reports (or provided directly to data scientists). An extract, transfer, load ETL process may be used to transform the raw data to the dimensional model. Reports may be provided from the raw data and/or the dimensional model.

Figure 11:
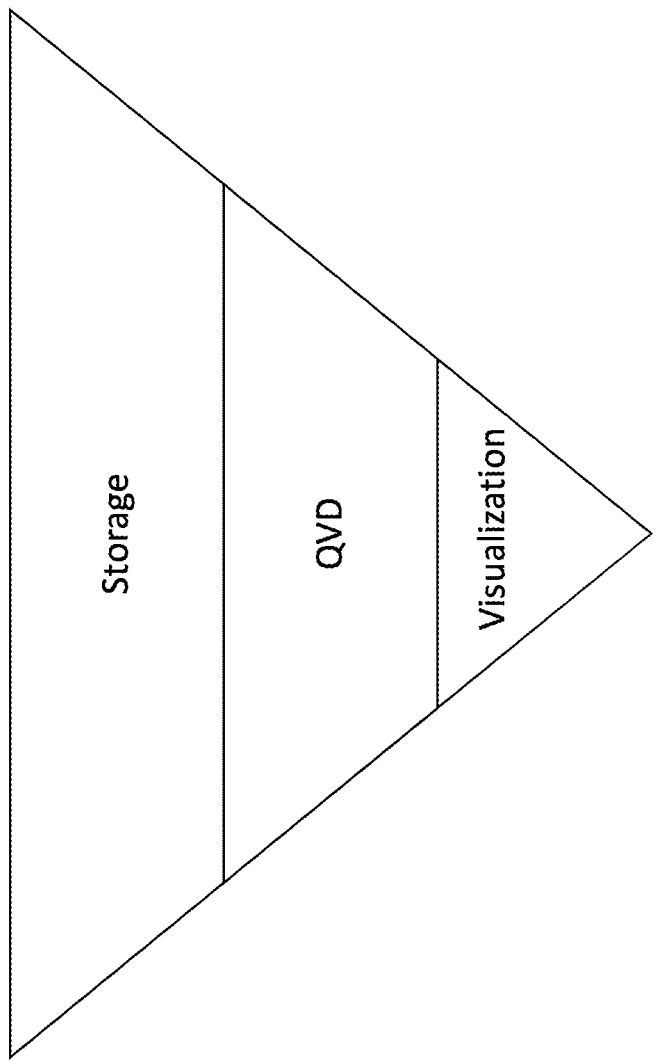
FIG. 11 shows the architecture of a reporting tool according to some embodiments.

FIG. 11 shows the architecture of a reporting tool in which data is directly imported from servers, e.g. MySQL (my sequel) or any other relational database management system servers, and all processing performed at the next level of the architecture, in this example QlikView (QV), before being provided to a visualisation layer. Other processing systems other than QV may alternatively or additionally be used. Such architecture may be suitable when dimensions are on a per user level. As more data are produced, for examples as games grow in popularity or the number of games increases, all reporting may be transitioned towards a per group (dimension) level. More and more processing may be pushed upstream. Architecture such as that of FIG. 11 may no longer be suitable.

Figure 12:
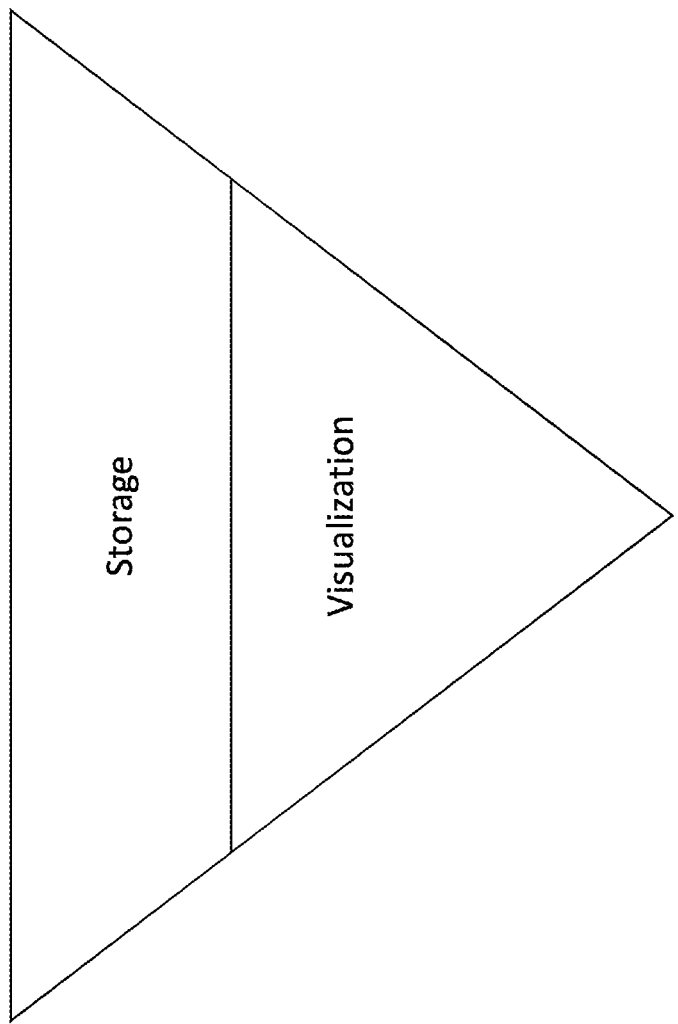
FIG. 12 shows the architecture of a reporting tool according to another embodiment.

An arrangement shown in FIG. 12 has a storage layer and a visualization layer. The visualization layer has to be much thicker (i.e. requires more processing) as compared to the scenario of FIG. 11.

With the improvement of the tracking and an increase in the number of games, there is a challenge of output to balance.

Figure 13:
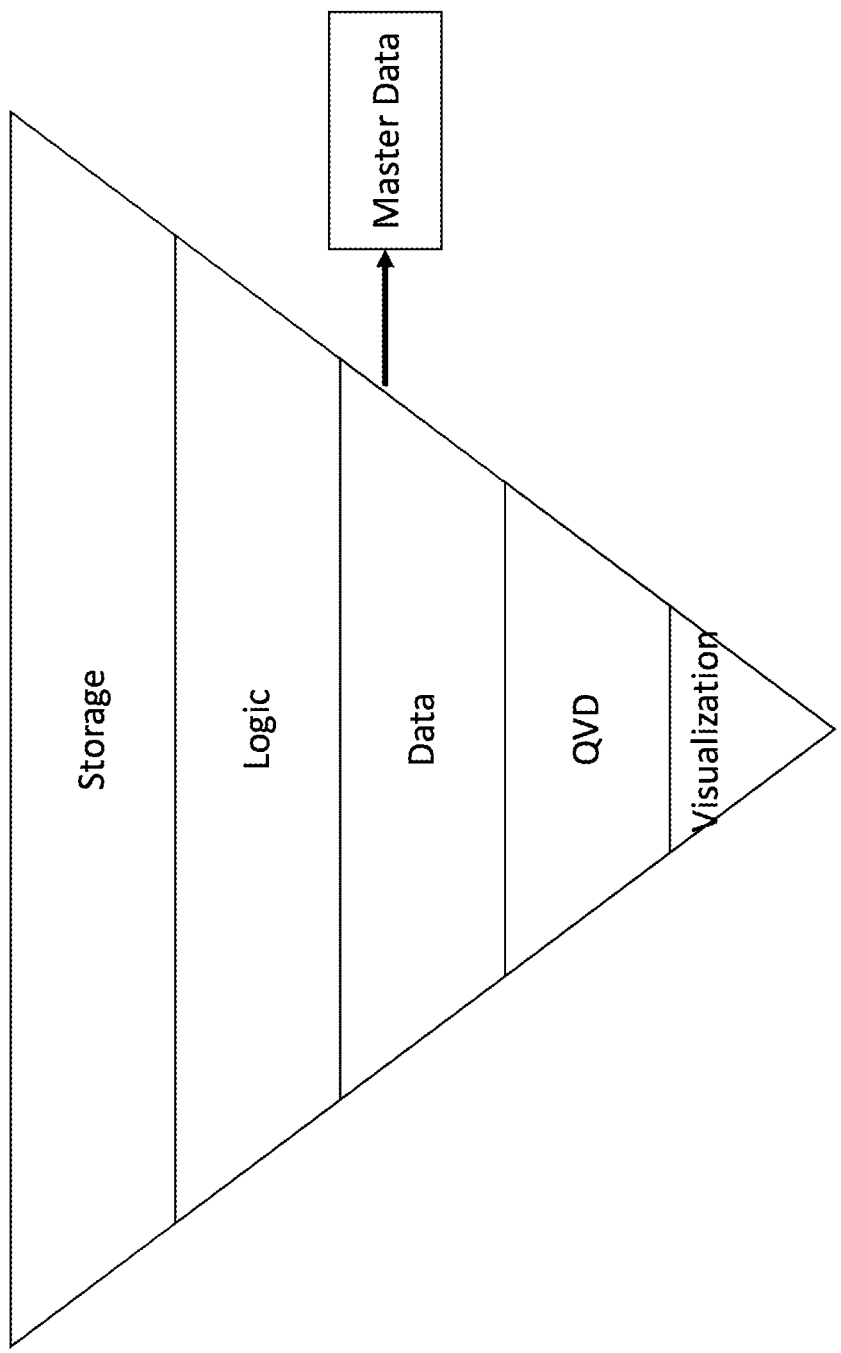
FIG. 13 shows the architecture of a reporting tool according to another embodiment.

An alternative solution is to apply all logic (and cleaning) as close to the source of the data as possible. FIG. 13 shows architecture of a reporting tool in accordance with some embodiments.

The reporting tool comprises a storage layer (for example, Hadoop cluster). Hadoop is an example of a computational cluster and in other embodiments, any other suitable computational cluster may be used. The storage layer is optimized for storage, not for speed—data can be dumped in this layer.

The architecture comprises a logic layer (for example, Exasol/Hive), the set of logic rules is provided as close to the storage as possible. Problems with data may be fixed at source. The architecture comprises a data layer (for example, Exasol/Hive). The cleaned data may be categorized into data types. This may make it easier to find data when searching.

The architecture may comprise a master data layer (e.g., Exasol/Hive) Master data dimensions are easily accessible and ready to be connected to ids in fact tables.

The logic layer produces a data layer, when pre-calculated KPIs (key performance indicators) and/or cleaned data can be fetched. The data layer may be separated into different types of data so that there is no need to search through the whole data when looking for a specific field or table. A notable separation of data types may be the separation of master data.

Exasol is an example of a relation database system. In other embodiments, any other suitable type of relation database system may be used. Hive is provided to support Hadoop structures.

Figure 14:
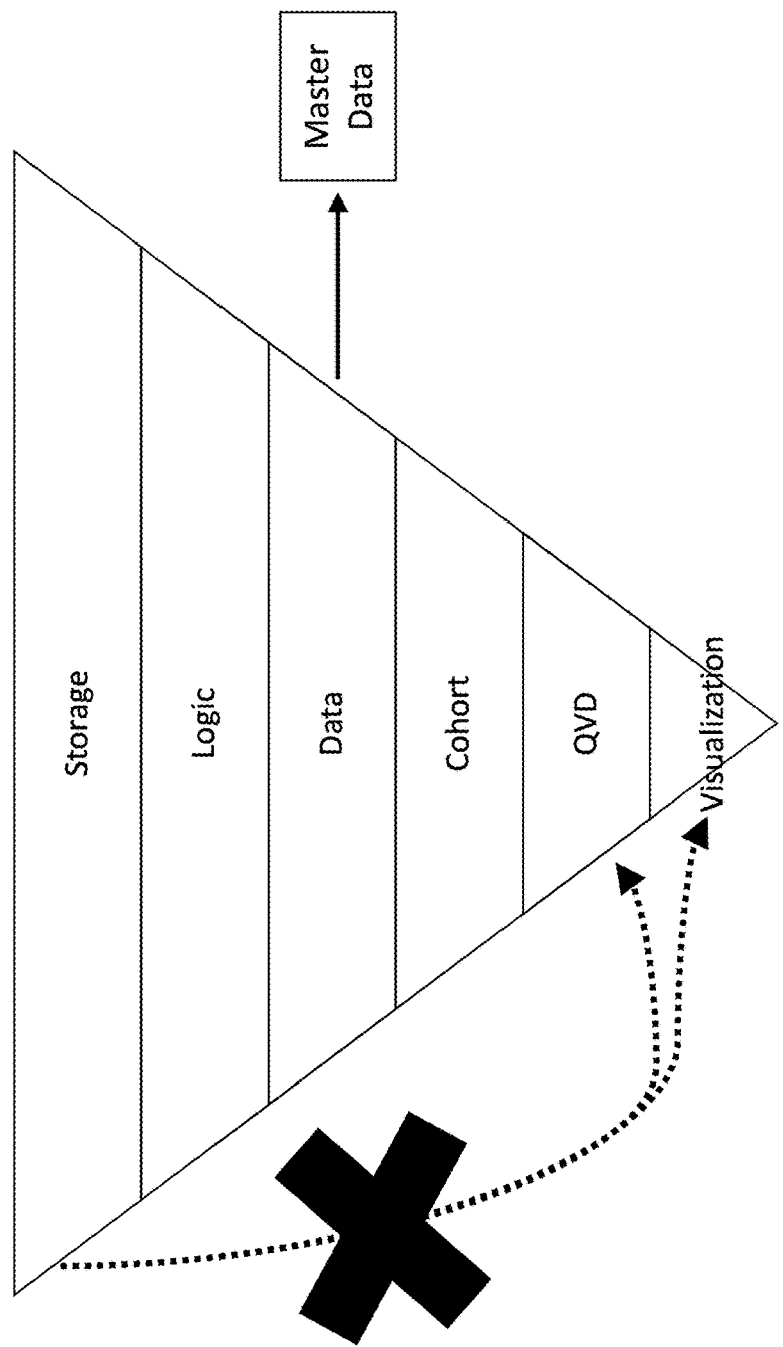
FIG. 14 shows the architecture of a reporting tool according to another embodiment.

As shown in FIG. 14, the architecture may comprise a cohort layer (e.g., Exasol datamart). The data in the cohort layer may be pre-aggregated and optimized for speed.

A QVD (QlikVliew data) layer (fileserver) is provided. The QVD layer may report a specific data layer. The QVD layer may be optimized for accessibility (and/or for storing optional data).

A visualization layer (Qlikview) is provided. The visualization layer is optimized for user experience.

Master data is a number of slowly changing dimensions that can be attributed to an ID, like ArticleName for articleID, or GameTitle for gameID. These are by way of example only and any other suitable ID (identity) may alternatively or additionally be used. The general idea is that master data can be applied to all values in the visualization layer, so there is no need to rerun an entire QVD layer because of an update of a field in the master data.

The aggregation of data from the data layer to the QVD layer may be a heavy duty for a daily process. As shown in FIG. 14, the architecture may comprise a layer, a cohort layer, for the most commonly used data. This layer may have a required minimum aggregation level (for example, daily).

This layer can pre-aggregate the most commonly used data from the data layer into what may be referred to as "cubes". These "cubes" may be fast to load from, but not very dynamic.

At the end of the data chain, QVD-loaders can load data from either the data layer (some cases) or the cohort layer (most cases) and store it on a dedicated fileserver.

It may not be desirable to fetch data directly from the storage layer as it may contain bad quality data, or even errors. In some embodiments, business logic may be provided in the QVD-loader which would negate providing all the logic in one place—the logic layer.

Finally these QVDs are loaded with an optimized load into the visualization layer. Thus in some embodiments, nothing is provided to the visualisation later without being used. In the visualization layer, if a field is not being used, it should not be kept. This helps keep the data environment maintainable. The field may be kept in the QVD layer or earlier up the chain if it may be needed in future.

Each layer may be provided with performance and maintainability in mind. The funnel of data from storage to visualization may provide only high quality data, delivered with dependability and speed. It may also avoid having to deal with one field with two different names in different reports.

The reason for this is that in addition to just adding layer upon layer of structure, each layer may be selected to do the function for which it designed. The surrounding framework may be built on top of those strengths.

Storage layer—Optimized for storage, not for speed. The data is dumped here.

Logic layer—Set of rules as close to the storage as possible. This allows problems to be fixed at source.

Data layer—Cleaned data categorized into data types. This makes it easier to find what is being looked for.

Master data layer—Master data dimensions easily accessible and ready to be connected to IDs in fact tables.

Cohort layer—Pre-aggregated data, optimized for speed.

QVD layer (fileserver)—Report specific data layer. Optimized for accessibility (also storing optional data).

Visualization layer—Optimized for user experience.

Figure 16:
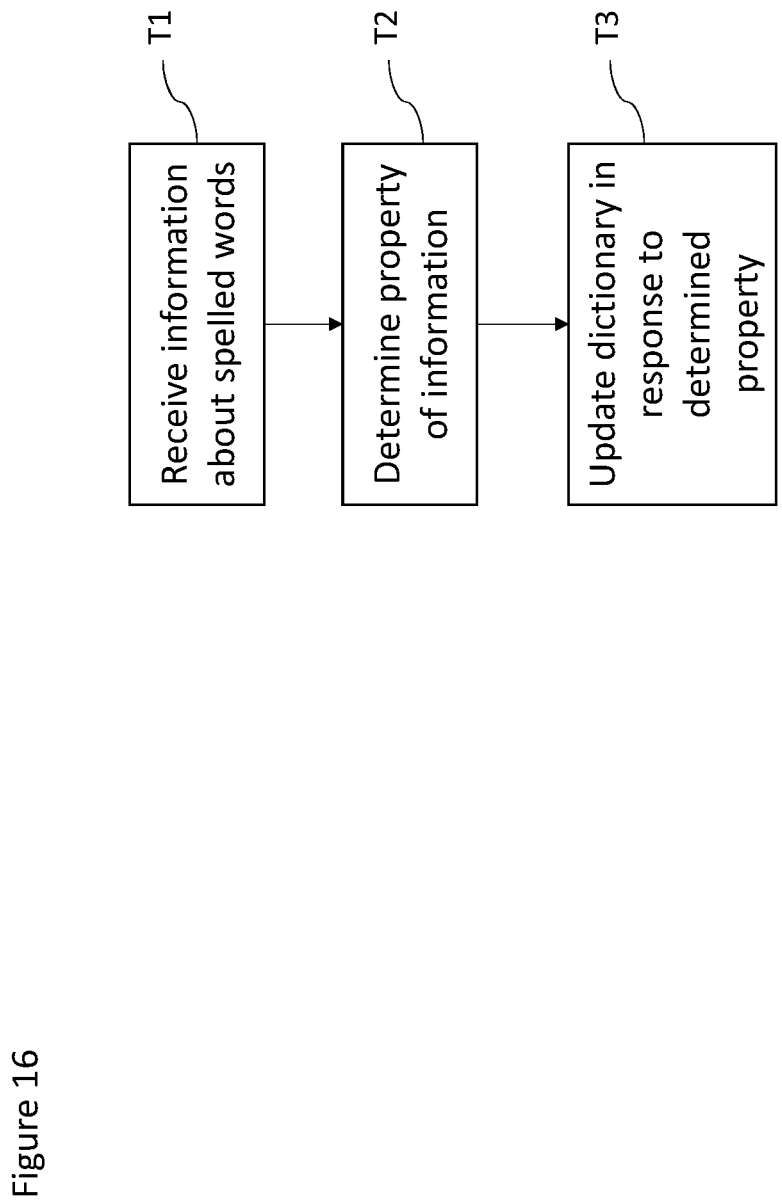
FIG. 16 is a flowchart according to an embodiment.

FIG. 16 is a flowchart according to some embodiments.

At step T1, information is received of at least one word spelled by one or more users on one or more respective game boards of one or more respective displays. This information is received for example at a server. This information is received in an electronic data message.

At step T2, a processor in communication with at least one memory is operated to determine a property of the received information. This may include extracting data from the electronic data message.

At step T3, the processor causes at least one dictionary stored in the at least one memory to be selectively updated in response to the determining the property. The at least one dictionary comprises a plurality of words of a first type and a plurality of words of a second type.

It will be understood that in addition to copying words to the second dictionary 462, words can also be removed from the second dictionary 462. For example a commonly used word or previously commonly used word may become less common or popular. A determination may therefore be made to remove a word from the second dictionary 462. This decision may be based upon a count of the number of uses of that word or the frequency of the use of that word. Threshold levels may be set, and if the number of uses or frequency of use of a word does not meet that count-threshold or frequency-threshold over a certain period of time then a decision may be made to remove that word from the second dictionary.

In some embodiments one or both of the first dictionary and second dictionary can be updated to include new words, to account for evolving languages. For example a new word (or an old word that has fallen out of usage) may enter or re-enter the lexicon of a language. Examples of new words include "headcam", "humblebrag" etc. A user playing the game may spell one of these new words during game play. For example a user may spell the word "headcam" on game board 400, which information is transmitted to I/O interface of processing block 407, in an electronic data message. Data (e.g. data of the spelled word) can be extracted from that electronic data message, and a comparison of that word can then be made with the valid words contained in the first and/or second dictionaries. In some embodiments this check will only need to be made at the first dictionary, since that dictionary contains the full list of valid words (and the second dictionary comprises a sub-set). If the word is not contained in either of those dictionaries but is considered to be a valid new word (e.g. because a number of uses or frequency of use of that word have reached a threshold) then it may be added to one or more of the first dictionary 460 and the second dictionary 462. This decision may be carried out by decision block 463. Adding the new word to the second dictionary 462 may also be dependent upon a determination of whether the new word is considered to be a commonly used word. In another embodiment, rather than automatically updating the dictionary or dictionaries with a new word, a flag or alert may be raised notifying an administrator of the dictionaries to check whether the new word is valid, and then the new word is only entered in to the dictionary or dictionaries if the administrator confirms the validity of the new word.

In some embodiments, the second dictionary may comprise a ranking of words. For example, the second dictionary may contain the two-hundred most commonly used words in a given language. In other embodiments the second dictionary may comprise more or fewer than 200 words. In some embodiments, the second dictionary may have a limit to the number of words that can be stored therein. This limit may be set by game designers. Therefore in some embodiments when a new word is added to the second dictionary it may be done so at the expense of another word in the second dictionary. The word that is removed from the second dictionary may be the lowest-ranked word at that time. Each word in the second dictionary may have a ranking attributed thereto, with respect to how commonly used that word is e.g. where "1" is the most commonly used word. This information may be used by the seeding algorithm 464 when determining a word or words to be inserted in to the game board 400. In some embodiments, the words may be stored in the second dictionary 462 in ranked order rather than alphabetical order.

The first and/or second dictionaries could initially be compiled in any known way, for example using existing dictionary information and/or existing information on the most commonly used words in a given language.

The game may for instance be played in an offline mode on a handheld device 200, 305 using locally stored information on the handheld device 200, 305. The device may store all or some of the levels that are available as applicable to the particular game and its saga or mission objectives. Some of the features may be locally executed on the device 200, 305. This may for instance implement a scheme to regenerate lives after a certain period of time, the time may be locally decided based on the clock on the device 200, 305. In some embodiments, the central game server 320 clock may override the local clock when the local device 200 has been synchronised with the server 320.

Some embodiments may be implemented to synchronize game state information 120, 150 and/or retrieve and connect to social graph information and user profile data on a social network 330 such as Facebook or Google+.

Some embodiments may be implemented to enable connection to a plurality of social networks 330. The user may be given the option to select which information may be derived and/or shared with which social network 330.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer-implemented method comprising:
receiving information of at least one word spelled by one or more users on one or more respective game boards of one or more respective displays;
operating a processor in communication with at least one memory to determine, for each word which is received, if the respective word is of a first type or of a second type, the plurality of words of the second type being categorized as more common than the plurality of words of the first type; and
the processor causing at least one dictionary stored in the at least one memory to be selectively updated in response to the determining and satisfying of at least one condition, said at least one dictionary comprising the words of the first type and the words of the second type, wherein said at least one dictionary is selectively updated to change a status of a received word of the first type to be a word of the second type.

2. A method as set forth in claim 1, wherein the plurality of words of the first type are stored in a first dictionary, and the plurality of words of the second type are stored in a second dictionary.

3. A method as set forth in claim 1, wherein the plurality of words of the second type and the plurality of words of the first type are of a common language.

4. A method as set forth in claim 1, wherein the condition comprises a count of how often the at least one word is received.

5. A method as set forth in claim 1, wherein the condition comprises a frequency with which the at least one word is received.

6. A device having a display configured to display a game board having a plurality of selectable game objects comprising tiles displayed in a configuration on said game board, a user interface configured to receive user input, and at least one processor in connection or communication with at least one memory and the user interface and configured to:
responsive to user input received via the user interface of said user device, determine a game level of a plurality of game levels which is to be provided, each game level having an associated difficulty;
use at least one dictionary stored in a memory to select one or more words stored in the at least one dictionary to seed an initial game board which is to be displayed on the display for the determined game level, the at least one dictionary comprising a plurality of words of a first type and a plurality of words of a second type, said words of the first type and the second type being in a common language, the plurality of words of the second type categorised as more common than the plurality of words of the first type, wherein at least one of a type of said selected at least one word and orientation in which said at least one word is displayed is dependent on the associated difficulty of the determined game level;
cause to be displayed on the display a plurality of selectable game objects comprising tiles arranged on the initial game board, each tile having a letter, said tiles in said game board being arranged to enable a user to select one or more of the tiles in a manner that spells a word, the initial game board including said selected at least one word;
receive user input, via the user interface, selecting a plurality of said tiles of said initial game board to spell a word;
determine if the spelled word comprises a valid input, said spelled word being a valid input if the spelled word is in said at least one dictionary, wherein words of said first type and words of said second type both comprise valid inputs;
in response to determining that said spelled word is a valid input, cause said selected tiles to be removed from said game board; and
cause said game board to be replenished after said selected tiles have been removed.

7. A device as set forth in claim 6, wherein the plurality of words of the first type and the plurality of words of the second type are stored in the same dictionary, and distinguished from each other by one or more flags.

8. A device as set forth in claim 6, wherein the plurality of words of the first type are stored in a first dictionary, and the plurality of words of the second type are stored in a second dictionary.

9. A device as set forth in claim 8, wherein the second dictionary comprises fewer words than the first dictionary.

10. An apparatus having at least one processor in connection or communication with at least one memory and configured to:
receive at a receiver of the apparatus information of at least one word spelled by one or more users on one or more respective game boards of one or more respective displays;
determine for each word which is received, if the respective word is of a first type or of a second type, the plurality of words of the second type being categorised as more common than the plurality of words of the first type; and
selectively update at least one dictionary stored in the at least one memory in response to the determining and satisfying of at least one condition, said at least one dictionary comprising the words of the first type and the words of the second type, wherein said at least one dictionary is selectively updated to change a status of a received word of the first type to be a word of the second type.

11. An apparatus as set forth in claim 10, wherein the plurality of words of the first type are stored in a first dictionary, and the plurality of words of the second type are stored in a second dictionary.

12. An apparatus as set forth in claim 10, wherein the plurality of words of the second type and the plurality of words of the first type are of a common language.

13. An apparatus as set forth in claim 10, wherein the condition comprises a count of how often the at least one word is received.

14. An apparatus as set forth in claim 10, wherein the condition comprises a frequency with which the at least one word is received.

15. A computer-implemented method of determining game objects to be displayed on a display comprising:

responsive to user input received via a user interface of said user device, determining a game level of a plurality of game levels which is to be provided, each game level having an associated difficulty;

causing a processor to use at least one dictionary stored in a memory to select one or more words stored in the at least one dictionary to seed an initial game board which is to be displayed on a display for the determined game level, the at least one dictionary comprising a plurality of words of a first type and a plurality of words of a second type, said words of the first type and the second type being in a common language, the plurality of words of the second type categorised as more common than the plurality of words of the first type, wherein at least one of a type of said selected at least one word and orientation in which said at least one word is displayed is dependent on the associated difficulty of the determined game level;

causing to be displayed on the display a plurality of selectable game objects comprising tiles arranged on the initial game board, each tile having a letter, said tiles in said game board being arranged to enable a user to select one or more of the tiles in a manner that spells a word, the initial game board including said selected at least one word;

receiving user input, via a user interface, selecting a plurality of said tiles of said initial game board to spell a word;

determining if the spelled word comprises a valid input, said spelled word being a valid input if the spelled word is in said at least one dictionary, wherein words of said first type and words of said second type both comprise valid inputs;

in response to determining that said spelled word is a valid input, said at least one processor is configured to cause said selected tiles to be removed from said game board; and causing said game board to be replenished after said selected tiles have been removed.

16. A method as set forth in claim 15, wherein the plurality of words of the second type and the plurality of words of the first type are of a common language.

17. A method as set forth in claim 15 wherein the plurality of words of the first type and the plurality of words of the second type are stored in the same dictionary, and distinguished from each other by means of one or more flags.

18. A method as set forth in claim 15, wherein the plurality of words of the first type are stored in a first dictionary, and the plurality of words of the second type are stored in a second dictionary.

19. A method as set forth in claim 18, wherein the second dictionary comprises fewer words than the first dictionary.

\* \* \* \* \*